(12) United States Patent
Hayase et al.

(10) Patent No.: US 9,350,830 B2
(45) Date of Patent: May 24, 2016

(54) WIRELESS COMMUNICATION BASE STATION AND WIRELESS COMMUNICATION METHOD

(71) Applicant: Hitachi, Ltd., Tokyo (JP)

(72) Inventors: Shigenori Hayase, Tokyo (JP); Kenzaburo Fujishima, Tokyo (JP); Hirotake Ishii, Tokyo (JP); Masanori Taira, Tokyo (JP)

(73) Assignee: HITACHI, LTD., Tokyo (JP)

( * ) Notice: Subject to any disclaimer, the term of this patent is extended or adjusted under 35 U.S.C. 154(b) by 80 days.

(21) Appl. No.: 14/155,779

(22) Filed: Jan. 15, 2014

(65) Prior Publication Data

US 2014/0201754 A1  Jul. 17, 2014

(30) Foreign Application Priority Data

Jan. 17, 2013  (JP) .................. 2013-006189

(51) Int. Cl.
| | |
|---|---|
| *H04L 1/00* | (2006.01) |
| *H04L 1/20* | (2006.01) |
| *H04L 29/08* | (2006.01) |
| *H04B 7/04* | (2006.01) |

(52) U.S. Cl.
CPC ............ *H04L 69/323* (2013.01); *H04B 7/0413* (2013.01); *H04L 1/00* (2013.01); *H04L 67/1002* (2013.01); *H04L 69/321* (2013.01); *Y02B 60/142* (2013.01); *Y02B 60/167* (2013.01); *Y02B 60/50* (2013.01)

(58) Field of Classification Search
CPC ............ H04L 27/2614; H04L 27/2649; H04L 69/323; H04L 1/0003; H04L 1/20; H04L 1/0001; H03M 13/1137
See application file for complete search history.

(56) References Cited

U.S. PATENT DOCUMENTS

| | | | | |
|---|---|---|---|---|
| 6,950,416 | B1 * | 9/2005 | Feuerstein | H01Q 3/24 370/335 |
| 7,272,556 | B1 * | 9/2007 | Aguilar | G10L 19/093 704/201 |
| 7,274,735 | B2 * | 9/2007 | Lusky | H04L 1/0001 375/227 |
| 7,420,986 | B1 * | 9/2008 | Howard | H04L 12/2801 370/222 |

(Continued)

FOREIGN PATENT DOCUMENTS

| | | |
|---|---|---|
| KR | 10-2010-0049311 A | 5/2010 |
| KR | 10-2010-0058396 A | 6/2010 |

(Continued)

*Primary Examiner* — Thuy Dao
(74) *Attorney, Agent, or Firm* — Volpe and Koenig, P.C.

(57) ABSTRACT

To prevent the switching time influences power saving performance and packet loss prevention performance, it is provided a wireless communication base station for communicating with a terminal, comprising: a plurality of baseband signal processing units for performing baseband signal processing; a baseband allocation unit for allocating the baseband signal processing to the plurality of baseband signal processing units; and a linear processing unit for composing signals processed by the plurality of baseband signal processing units. The baseband allocation unit selects, for each data block, a baseband signal processing unit to which the baseband signal processing for the each data block is to be allocated out of the plurality of baseband signal processing units. Each of the plurality of baseband signal processing units performs the allocated baseband signal processing. The linear processing unit composes, by means of linear calculation, the signals processed by the plurality of baseband signal processing units.

6 Claims, 6 Drawing Sheets

| BASEBAND SIGNAL PREPROCESSOR | PROCESSING LOAD |
|---|---|
| 1 | 24 |
| 2 | 13 |
| ... | ... |

CUMULATIVE PROCESSING LOAD TABLE

(56) References Cited

U.S. PATENT DOCUMENTS

| | | | | |
|---|---|---|---|---|
| 7,936,841 B2* | 5/2011 | Erving | ............... | H04L 1/0003 375/295 |
| 2003/0097623 A1* | 5/2003 | Razavilar | ............ | H04L 1/0016 714/704 |
| 2008/0130788 A1* | 6/2008 | Copeland | .................... | 375/297 |
| 2008/0205318 A1* | 8/2008 | Gupta | ............... | H04B 1/1615 370/311 |
| 2010/0208680 A1* | 8/2010 | Nam et al. | .................. | 370/329 |
| 2011/0228748 A1 | 9/2011 | Han et al. | | |
| 2011/0287791 A1 | 11/2011 | Fujishima et al. | | |
| 2012/0066396 A1* | 3/2012 | Kang et al. | .................. | 709/226 |
| 2013/0135990 A1* | 5/2013 | Draznin | ....................... | 370/221 |

FOREIGN PATENT DOCUMENTS

| | | |
|---|---|---|
| WO | 2009/066954 A2 | 5/2009 |
| WO | 2010/087031 A1 | 8/2010 |

* cited by examiner

| DATA BLOCK ID (X) | ALLOCATED BASEBAND SIGNAL PREPROCESSOR |
|---|---|
| 1 | 1 |
| 2 | 2 |
| 5 | 2 |
| 10 | 1 |
| ... | ... |

DATA-PROCESSOR MAP TABLE

… (0)

WIRELESS COMMUNICATION BASE STATION AND WIRELESS COMMUNICATION METHOD

CLAIM OF PRIORITY

The present application claims priority from Japanese patent application JP 2013-6189 filed on Jan. 17, 2013, the content of which is hereby incorporated by reference into this application.

BACKGROUND OF THE INVENTION

This invention relates to a wireless communication base station.

As background art of this technical field, there is given WO 2010/087031 A. WO 2010/087031 A describes "a wireless communication system including: a plurality of base stations each constructing a plurality of cells; and one terminal for communicating to/from the plurality of base stations. Each of the plurality of base stations includes one or more antennas. The base station transmits a first reference signal which is unique to the antenna, and thus is not the same as those of at least close base stations. The terminal receives the first reference signals, estimates a received electric power of the first reference signal of each of the antennas, selects a plurality of antennas suitable for the communication based on an estimation result for the received electric powers, and transmits a selection result for the antenna to the base station. The base station refers to the selection result for the antenna transmitted from the terminal, allocates the plurality of antennas belonging to different cells to the terminal, and notifies the terminal of an allocation result for the antennas."

SUMMARY OF THE INVENTION

WO 2010/087031 A discloses a configuration of the base station which uses a plurality of baseband signal preprocessors. However, WO 2010/087031 A does not disclose a method of allocating the processing to the plurality of baseband signal preprocessors.

Depending on a method of allocating the processing, processing performances of the baseband signal preprocessors may not be sufficiently used. For example, when the processing is allocated unequally, the processing performed by the baseband, signal preprocessor high in load is not completed within a predetermined period. Moreover, the baseband processing needs to be allocated so as to match a wireless communication method. For example, data to be retransmitted may not appropriately be processed by the signal processing.

In view of the above, this invention provides a method of appropriately allocating processing to a plurality of baseband signal preprocessors. For example, this invention provides a method of reducing a period required for the processing allocated to the baseband signal preprocessors and a method suitable for signal processing applied to data to be retransmitted.

The representative one of inventions disclosed in this application is outlined as follows. There is provided a wireless communication base station for communicating with a terminal, comprising: a plurality of baseband signal processing units for performing baseband signal processing; a baseband allocation unit for allocating the baseband signal processing to the plurality of baseband signal processing units; and a linear processing unit for composing signals processed by the plurality of baseband signal processing units. The baseband allocation unit selects, for each data block, a baseband signal processing unit to which the baseband signal processing for the each data block is to be allocated out of the plurality of baseband signal processing units. Each of the plurality of baseband signal processing units performs the allocated baseband signal processing. The linear processing unit composes, by means of linear calculation, the signals processed by the plurality of baseband signal processing units.

According to the exemplary embodiment of this invention, the baseband processing can be appropriately performed in the base station including the plurality of baseband signal preprocessors. Problems, configurations, and effects which have not been described become apparent from the following description of embodiments.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

A description is now given of embodiments of this invention by referring to the accompanying drawings.

First Embodiment

Figure 1:
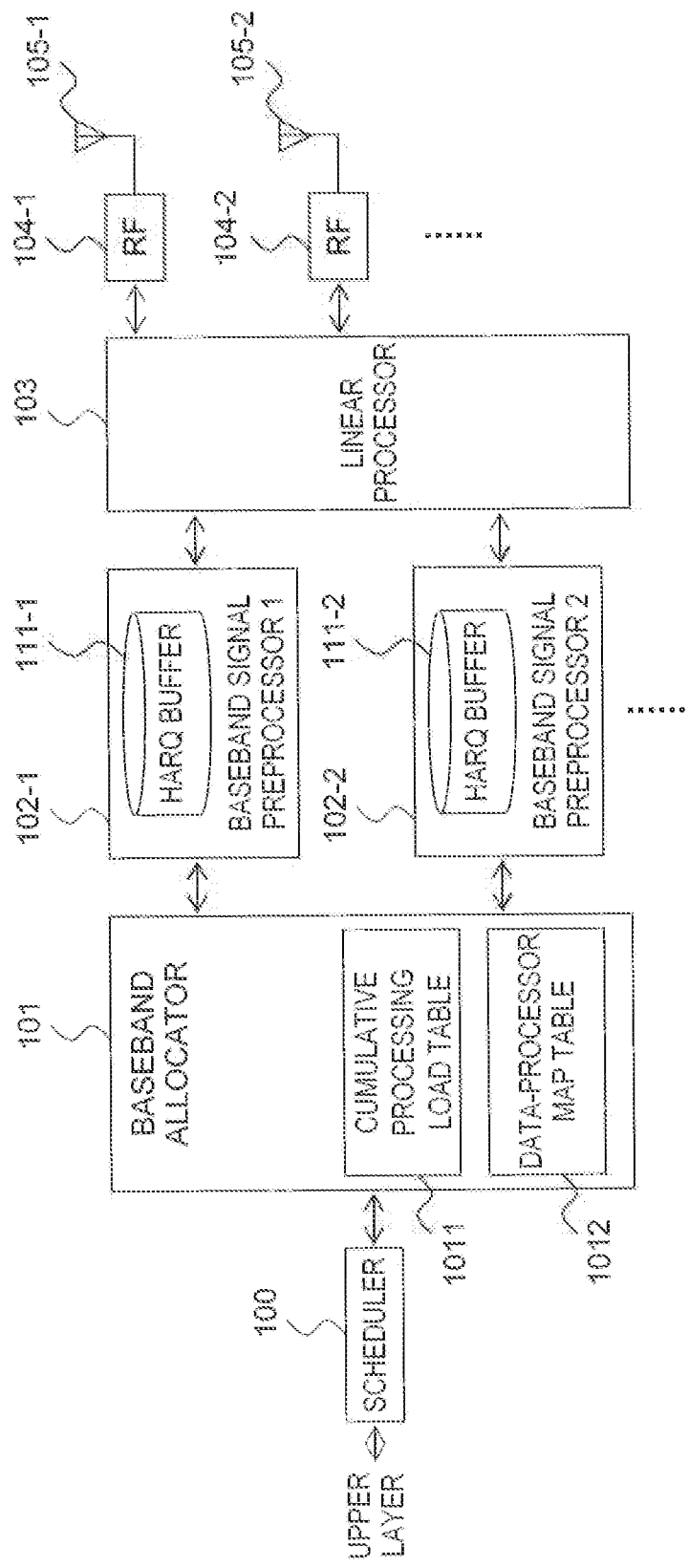
FIG. 1 is a block diagram illustrating a configuration of a wireless communication base station according to a first embodiment.

FIG. 1 is a block diagram illustrating a configuration of a wireless communication base station according to a first embodiment of this invention.

Conventionally, dynamic allocation of processing to a plurality of baseband signal preprocessors is not assumed, and hence such a configuration of a base station as that is configured to dynamically allocate the processing does not exist. Moreover, when the processing is randomly allocated to the baseband signal preprocessors, processing by a baseband signal preprocessor on which the processing is concentrated may not be completed within a predetermined period. In the first embodiment, the processing is dynamically allocated to the plurality of baseband signal preprocessors.

The wireless communication base station according to the first embodiment includes a scheduler 100. a baseband allocator 101, a plurality of baseband signal preprocessors 102, a linear processor 103, RF parts 104, and antennas 105. The plurality of baseband signal preprocessors (such as 102-1 and 102-2) are provided, A single or a plurality of the RF parts 104 and the antennas 105 may be provided.

First, a description is given of processing for a downlink signal.

The scheduler 100 receives data to be transmitted to a user terminal from an upper layer, and allocates a modulation and coding scheme (MCS) to be applied to the data, and a resource to which the data is disposed. In a wireless communication system employing the orthogonal frequency division multiple access (OFMDA), a subcarrier is a candidate of the resource to be allocated, and in a wireless communication system employing the multiple-input multiple-output (MIMO), a degree of freedom in space directions (such as layer and stream) is a candidate of the resource to be allocated.

The scheduler 100 transmits the data, the MCS, and the resource allocation information to the baseband allocator 101. The baseband allocator 101 determines a baseband signal preprocessor 102 for processing the data transmitted from the scheduler 100.

The baseband allocator 101 transmits the data, the MCS, and the resource allocation information transmitted from the scheduler 100 to the determined baseband signal preprocessor 102.

The baseband allocator 101 includes a cumulative processing load table 1011 and a data-processor map table 1012. A description is later given of a configuration example of the cumulative processing load table 1011 referring to FIG. 2. A description is later given of a configuration example of the data-processor map table 1012 referring to FIG. 5. It should be noted that the data-processor map table 1012 is used in a third embodiment of this invention, and is not necessary in the other embodiments.

The baseband signal preprocessor 102 applies signal processing to the data transmitted from the scheduler 100 depending on a standard of a wireless communication method, thereby generating a transmission signal. The baseband signal preprocessor 102 transmits the generated transmission signal to the linear processor 103. The baseband signal preprocessor 102 includes a HARQ buffer 111 for holding transmission signals for downlink communication.

The linear processor 103 receives the transmission signals generated by the plurality of baseband signal preprocessors 102, and composes the received transmission, signals by means of linear transform. The linear processor 103 generates as many signals as the number of the antennas 105 by means of the composition. The linear processor 103 transmits the composed signals to the RF parts 104.

Each of the RF parts 104 transforms the signal transmitted from the linear processor 103 into an analog signal, and further converts a carrier frequency, thereby generating a wireless signal. The RF part 104 transmits the wireless signal to the antenna 105, and the wireless signal is emitted as an electromagnetic wave from the antenna 105.

The above-mentioned respective parts are implemented by a processor for executing predetermined programs, hardware (analog circuits and digital circuits) for performing predetermined processing, or a combination of software and hardware. The program executed by the processor is provided for a wireless base station apparatus by means of a removable medium (such as a CD-ROM and a flash memory) or via a network, and is stored in an auxiliary storage apparatus, which is a non-transitory storage medium (such as a magnetic disk apparatus and a nonvolatile semiconductor storage apparatus). Therefore, the wireless base station apparatus preferably includes an interface for reading the removable medium.

When the downlink signal is processed by the plurality of baseband signal preprocessors 102, the transmission signals generated by the plurality of baseband signal preprocessors 102 are composed. In wireless communication methods currently employed, linear signal multiplexing methods are widely employed. The OFDMA and the MIMO also employ linear signal multiplexing methods. Thus, in the configuration described in this embodiment, the linear processor 103 can compose the transmission signals generated by the plurality of baseband signal preprocessors 102 by means of the linear transform, thereby generating the transmission signals. The linear transform performed by the linear processor 103 depends on an interface between the baseband signal preprocessor 102 and the linear processor 103.

For example, when the inverse Fourier transform in the OFDMA and the precoding operation in the MIMO are performed by the baseband signal preprocessor 102, the linear operation performed by the linear processor 103 is a simple addition of the signals transmitted from the plurality of baseband signal preprocessors 102. When any one of die inverse Fourier transform in the OFDMA and the preceding operation in the MIMO, or both thereof are not performed by the baseband signal preprocessors 102, only the operation which is not performed (the inverse Fourier transform or the precoding operation) needs to be performed by the linear transform by the linear processor 103.

Now, a description is given of processing for an uplink signal.

The scheduler 100 allocates an MCS to be applied to data received from the user terminal, and a resource to which the data is allocated. The scheduler 100 transmits the MCS and the resource allocation information to the baseband allocator 101.

The RF part 104 converts a carrier frequency of a wireless signal acquired from the antenna 105. further converts the signal into a digital signal, and transmits the converted signal to the linear processor 103. The linear processor 103 applies linear transform to the signal transmitted from the RF part 104, and transmits the transformed signal to the baseband signal preprocessor 102. As described later, the linear processor 103 may not particularly process the signal, and may transmit the signal transmitted from the RF part 104 to all the baseband signal preprocessors 102.

The baseband signal preprocessor 102 processes the signal transmitted from the linear processor 103 depending on the MCS and the resource allocation information transmitted from the baseband allocator 101, thereby recovering data received from the user terminal. The baseband signal preprocessors 102 transmit the received data via the baseband allocator 101 and the scheduler 100 to the upper layer.

When the plurality of baseband signal preprocessors 102 process the uplink signal, the linear processor 103 may not particularly process the signals, and may transmit the signals to the baseband signal preprocessors 102. Alternatively, the linear processor 103 may perform any one of the inverse Fourier transform in the OFDMA and the preceding operation in the MIMO, or both thereof.

It should be noted that the scheduler 100, the baseband allocator 101, the baseband signal preprocessors 102, the linear processor 103, the RF parts 104, and the antennas 105 do not always need to be included in the same apparatus. For example, the RF parts 104 and the antennas 105 may be arranged at actual antenna locations, and the scheduler 100, the baseband allocator 101, the baseband signal preprocessors 102, and the linear processor 103 may be arranged at a center station for managing a plurality of base stations.

All the plurality of baseband signal preprocessors 102 have the same function, and a processing characteristic of the baseband signal preprocessors 102 can thus increase only by adding the baseband signal preprocessor 102, thereby adding the baseband signal preprocessor 102 to the ones to which the load is to be allocated by the baseband allocator 101. Thus, only work of installing the baseband signal preprocessor 102 in the center station can easily increase a processing performance of the base station according to the first embodiment.

Figures 2, 3:
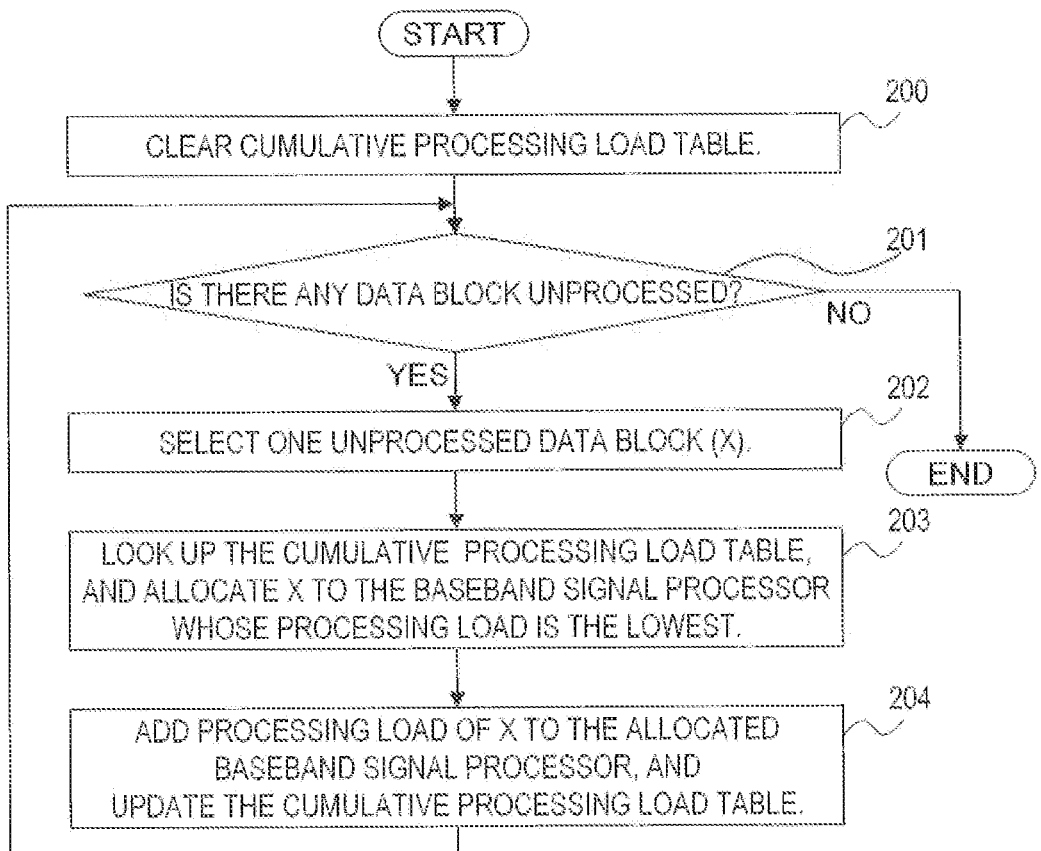
FIG. 2 is an explanatory diagram illustrating a configuration example of the cumulative according to the first embodiment.
FIG. 3 is a flowchart of processing performed by the baseband allocator according to the first embodiment.

FIG. 2 illustrates a configuration example of the cumulative processing load table 1011.

The cumulative processing load table 1011 stores values each acquired by accumulating the load of the processing allocated to each of the baseband signal preprocessors 102, and manages the cumulative processing loads on all the baseband signal preprocessors 102. In the example illustrated in FIG. 2, the cumulative processing load of a baseband signal preprocessor 1 is 24 and the cumulative processing load of a baseband signal preprocessor 2 is 13, and the load on the baseband signal preprocessor 2 is thus smaller.

As an index of the processing load, a number of allocated data blocks, a number of subcarriers corresponding to the allocated data blocks, a number of bits corresponding to the allocated data blocks, and the like can be used.

FIG. 3 is a flowchart of processing performed by the baseband allocator 101 according to the first embodiment. The processing is performed for each basic unit (such as a frame) of the data allocation after the MCS and the resource allocation information are transmitted from the scheduler 100 to the baseband allocator 101.

First, the baseband allocator 101 clears the cumulative processing load table 1011 (Step 200). Specifically, the baseband allocator 101 clears the cumulative processing loads on all the baseband signal preprocessors 102 to zero.

Then, processing in Steps 201 to 204 is repeated for all the data blocks. In Step 201, the baseband allocator 101 determines whether there is an unprocessed data block or not, and finishes the processing when all the data blocks have been processed.

On the other hand, when there is an unprocessed data block, the baseband allocator 101 selects one unprocessed data block (Step 202). In the following description, an ID of the selected data block is x. On this occasion, the data block is a set of data which cannot be divided any more in the baseband signal processing, and is usually a set of data to which error correction processing is to be applied. The data block is referred to as "transport block" in the 3GPP standard. The ID of the data block may be an ID newly set for this processings or may be an ID given in a standard operation. The RNTI can be used as the ID in the 3GPP standard.

Then, the baseband allocator 101 looks up the cumulative processing load table 1011, and searches for the baseband signal preprocessor 102 whose cumulative processing load is the lowest (Step 203). For example, in the example of the cumulative processing load table 1011 illustrated in FIG. 2, the cumulative processing load on the baseband signal preprocessor 2 is lower than the cumulative processing load on the baseband signal preprocessor 1. When a plurality of baseband signal preprocessors 102 have the lowest cumulative processing load (for example, in an initial state, all the baseband signal preprocessors 102 have a cumulative processing load of 0), one may be appropriately selected from the baseband signal preprocessors 102 having the lowest cumulative processing load. Processing for the data block X is allocated to the retrieved baseband signal preprocessor 102 having the lowest cumulative processing load.

Then, the baseband allocator 101 reflects a processing load for the data block allocated in Step 203 to the cumulative processing load table 1011 (Step 204). Specifically, the baseband, allocator 101 calculates the processing load for the data block X, and adds the calculated processing load to the cumulative processing load on the corresponding baseband signal preprocessor 102 stored in die cumulative processing load table 1011, thereby updating the cumulative processing load table 1011. Then, the processing returns to Step 201, and the baseband allocator 101 repeats the processing until all the data blocks are processed.

As described above, according to the first embodiment, the processing can be allocated to the plurality of baseband signal preprocessors 102, and the processing can be prevented from being concentrated on a certain baseband signal preprocessor 102.

Moreover, the processing of allocating the processing to the baseband signal preprocessor 102 may be applied separately to the baseband signal processing for the downlink signal and the baseband processing for the uplink signal, or may be applied to the baseband signal processing for a combination of the downlink signal and the uplink signal. For example, in a TDD system (such as the TD-LTE and the WiMAX), loads imposed on the uplink signal processing and the downlink signal processing change depending on a ratio in time allocated to the uplink signal and the downlink signal, and hence the assignment of the processing to the plurality of baseband signal preprocessors 102 is conventionally difficult. However, the method according to this embodiment can allocate the processing in any case in the same manner.

Second Embodiment

A description is now given of a second embodiment of this invention.

The processing is allocated to all the baseband signal preprocessors 102 in the first embodiment. However, if a communication data amount is small and only a part of the baseband signal preprocessors 102 thus need to be used, an electric power is consumed wastefully when a large number of baseband signal preprocessors 102 are operated. In the second embodiment, such control that only a part of the plurality of baseband signal preprocessors 102 operate is provided. It should be noted that the descriptions of like configurations and processing as of the first embodiment are omitted in the second embodiment.

Figures 4, 5:
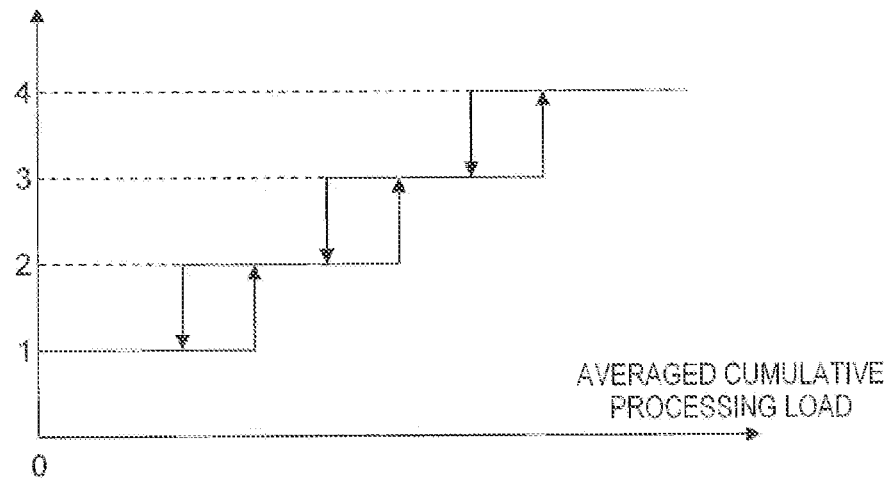
FIG. 4 is an explanatory diagram illustrating a relationship between an averaged cumulative processing load and the number of baseband signal preprocessors according to a second embodiment.
FIG. 5 is an explanatory diagram illustrating a configuration example of the data processor map table according to a third embodiment.

FIG. 4 is an explanatory diagram illustrating a relationship between an averaged cumulative processing load and the number of baseband signal preprocessors 102 according to the second embodiment, and the horizontal axis represents the averaged cumulative processing load and the vertical axis represents the number of baseband signal preprocessors 102 in use.

The baseband allocator 101 monitors the averaged cumulative processing load, and when the averaged cumulative processing load increases, increases the number of baseband signal preprocessors 102 in use depending on a definition illustrated in FIG. 4. On the other hand, when the averaged cumulative processing load decreases, the baseband allocator 101 decreases the number of baseband signal preprocessors 102 in use. Hysteresis is provided in order to prevent the number of baseband signal preprocessors 102 in use from frequently changing.

It should be noted that the second embodiment can be applied to any of the first, third, and fourth embodiments of this invention.

As described above, the number of baseband signal preprocessors 102 in use is changed in the second embodiment. Therefore, when the communication data amount is small, a part of the baseband signal preprocessors 102 can be prevented from operating, thereby decreasing the electric power consumption. Moreover, when the communication data amount increases, the operation of the stopped baseband signal preprocessors 102 can be started, thereby increasing a processing amount.

Third Embodiment

A description is now given of a third embodiment of this invention,

An error in data frequently occurs in the wireless communication. Therefore, the hybrid automatic repeat request (HARQ) which is an automatic retransmission mechanism combined with, an error detection code is widely employed. The base station holds a transmission signal until a normal reception for the downlink communication is notified from the user terminal in order to conform to the HARQ for the downlink communication. In the HARQ retransmission, processing up to error correction coding is the same as that for an initial time, and hence the signal to which the error correction coding is applied may be held in the HARQ buffer 111. Therefore, the HARQ buffer 111 holds the transmission signals for the downlink communication.

Moreover, the base station holds received signals until the uplink communication is normally received for conforming to the HARQ for the uplink communication. Signals received up to the current time are composed, thereby performing error correction processing, resulting in an improvement in reception characteristic when the HARQ retransmission is performed. Therefore, the HARQ buffer 111 holds die reception signals for die uplink communication.

On this occasion, the HARQ buffer 111 may not be a buffer shared among the plurality of baseband, signal preprocessors 102. and may be implemented in a memory occupied by each of the baseband signal preprocessors 102. In this case, a signal of a certain data block for the first transmission is stored in the HARQ buffer 111 of a baseband signal preprocessor 102 allocated to the first transmission. When the data block is retransmitted for the HARQ, if the baseband allocator 101 allocates a baseband signal preprocessor 102 different from that for the first transmission, the allocated baseband signal preprocessor 102 cannot make access to the signal stored in the HARQ buffer 111, and cannot continue the processing. Therefore, in the third embodiment, the data block retransmitted by means of the HARQ is allocated to the same baseband signal preprocessor 102 as that for the first transmission.

In the third embodiment, like configurations and processing as of the first embodiment are denoted by like numerals, and the descriptions thereof are omitted.

FIG. 5 illustrates a configuration example of the data-processor map table 1012 according to the third embodiment.

The data-processor map table 1012 is a table for holding each of pairs of a data block ID and an allocated baseband signal preprocessor 102. In the example illustrated in FIG. 5, data blocks having IDs of 1 and 10 are processed by the baseband signal preprocessor 1, and data blocks having IDs of 2 and 5 are processed by the baseband signal preprocessor 2. The data-processor map table 1012 enables identification of a baseband signal preprocessor 102 which has processed a data block for the first transmission. In the third embodiment, the data-processor map table 1012 is used to allocate a baseband signal preprocessor 102 to a data block subject to the HARQ retransmission.

Figure 6:
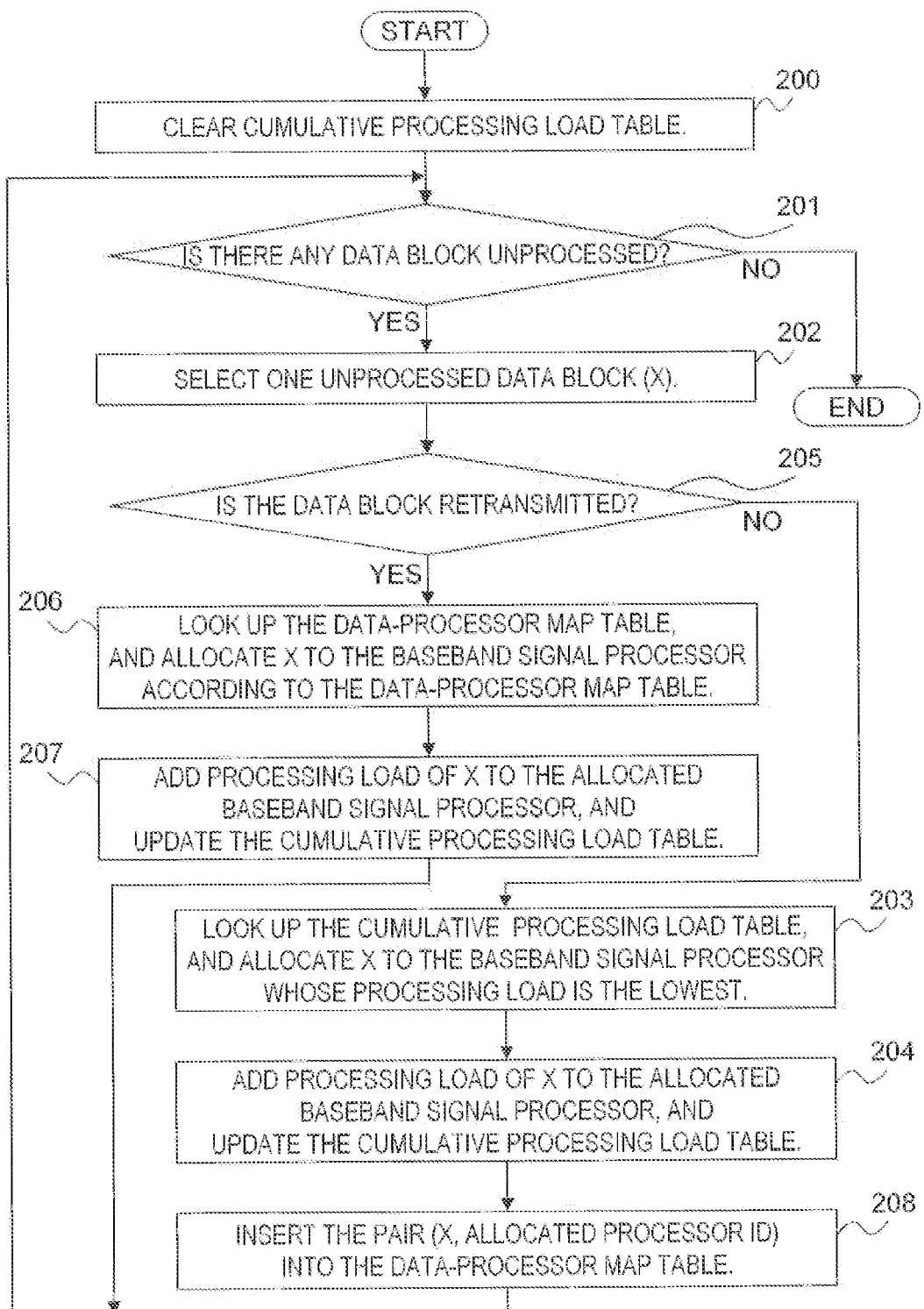
FIG. 6 is a flowchart of processing performed by the baseband allocator according to the third embodiment.

FIG. 6 is a flowchart of processing performed by the baseband allocator 101 according to the third embodiment. The processing is performed for each basic unit (such as a frame) of the data allocation after the MCS and the resource allocation information are transmitted from the scheduler 100 to the baseband allocator 101.

First, the baseband allocator 101 clears the cumulative processing load table 1011 (Step 200).

Then, processing in Steps 201 to 204 is repeated for all the data blocks. In Step 201, the baseband allocator 101 determines whether there is an unprocessed, data block or not. and finishes the processing when all the data blocks have been processed.

On the other hand, when there is an unprocessed data block, the baseband allocator 101 selects one unprocessed data block (Step 202). In the following description, an ID of the selected data block is x. On this occasion, the data block is a set of data which cannot be divided any more in the baseband signal processing, and is usually a set of data to which error correction processing is to be applied. The data block is referred to as "transport block" in the 3GPP standard. The ID of the data block may be an ID newly set for this processing, or may be an ID given in a standard operation. The RNTI can be used as the ID in the 3GPP standard.

Then, the baseband allocator 101 determines whether the data block X is subject to the HARQ retransmission or not (Step 205). When the data block X is subject to the HARQ retransmission, the processing proceeds to Step 206, and when the data block is subject to the first transmission, the processing proceeds to Step 203.

When the data block X is subject to the HARQ retransmission, the baseband allocator 101 looks up the data-processor map table 1012, thereby acquiring the ID of a baseband signal preprocessor 102 allocated when the data block X was transmitted for the first time (Step 206).

Then, the baseband allocator 101 reflects a processing load for the data block allocated in Step 206 to the cumulative processing load table 1011 (Step 207). Specifically, the baseband allocator 101 calculates the processing load for the data block X. and adds the calculated processing load to the cumulative processing load on the corresponding baseband signal preprocessor 102 stored in the cumulative processing load table 1011, thereby updating the cumulative processing load table 1011. The processing load added in Step 207 is a processing load imposed by the HARQ retransmission. Particularly in the transmission processing for the downlink communication, the processing load for the retransmission often decreases from that for the first transmission, and the cumulative processing load may be updated by a processing load smaller than that for the first transmission. Then, the processing returns to Step 201, and the baseband allocator 101 repeats the processing until all the data blocks are processed.

On the other hand, when the data block is subject to the first transmission, the baseband allocator 101 looks up the cumulative processing load table 1011, and searches for the baseband signal preprocessor 102 whose cumulative processing load is the lowest (Step 203). Processing for the data block X is then allocated to the retrieved baseband signal preprocessor 102 having the lowest cumulative processing load.

Then, the baseband allocator 101 reflects a processing toad for the data block allocated in Step 203 to the cumulative processing load table 1011 (Step 204).

Then, the baseband allocator 101 inserts the pair of the data block X and the baseband signal preprocessor 102 allocated in Step 203 into the data-processor map table 1012 (Step 208). As a result, when the same data block X is retransmitted by means of the HARQ next time, the data block X can be allocated to the same baseband signal preprocessor 102 as that for the first time. Then, the processing returns to Step 201, and the baseband allocator 101 repeats the processing until all the data blocks are processed.

As describe above, in the third embodiment, the processing for the data block subject to the HARQ retransmission can be allocated to the same baseband signal preprocessor 102 as that for the first transmission, resulting in effective use of the HARQ buffer 111.

It should be noted that in the third embodiment, the data block subject to the HARQ retransmission is allocated to the same baseband, signal preprocessor 102 as that for the first transmission independently of the cumulative processing load. Therefore, when the processing of allocating a large number of data blocks subject to the HARQ retransmission is performed last, and the allocation Is concentrated on a specific baseband signal preprocessor 102, a processing load on the specific baseband signal preprocessor 102 may increase. Therefore, in the third embodiment, when the processing is allocated to the baseband signal preprocessor 102, a data block subject to the HARQ retransmission may be allocated in priority to the baseband signal preprocessor 102.

A flowchart illustrated in FIG. 6 includes the processing of inserting a pair of the data block ID and the baseband signal preprocessor 102 into the data-processor map table 1012, and may include processing of freeing the pair of the data block ID and the baseband signal preprocessor 102. The freeing may be performed at the same time as when the memory for the HARQ buffer 111 is freed, and the memory may foe freed, for example, after the HARQ retransmission exceeds an upper limit of the number of retransmissions.

Usually, the number of HARQ retransmissions is managed by the scheduler 100. Therefore, the baseband allocator 101 receives a HARQ buffer freeing notification for the data block which exceeds the upper limit in number of HARQ retransmissions from the scheduler 100. When the baseband allocator 101 receives the HARQ buffer freeing notification, the baseband allocator 101 acquires the ID of a baseband signal preprocessor 102 which has processed the data block from the data-processor map table 1012, transmits a HARQ buffer freeing request to the baseband signal preprocessor 102 represented by the acquired ID, and frees a record of the data block from the data-processor map table 1012.

Moreover, the freeing may be performed after a signal is successfully received. In this case, the baseband allocator 101 may perform the freeing after the reception of the HARQ buffer freeing notification from the scheduler 100. Further, the baseband signal preprocessor 102 detects a successful reception of the uplink communication. Therefore, the baseband allocator 101 may receive a notification of a data block ID of the successfully received data block from the baseband signal preprocessor 102. and may free the record of the data block from the data-processor map table 1012.

Fourth Embodiment

A description is now given of a fourth embodiment of this invention.

A signal multiplexing technology called MIMO is used in wireless communication. The MIMO processes a plurality of signals by multiplying a matrix to the signals. The plurality of signals may be generated by a plurality of different data blocks. Therefore, the signal processing can be more efficiently performed by allocating the plurality of data blocks to be multiplexed by means of the MIMO to the same baseband signal preprocessor 102. In the fourth embodiment, data blocks multiplexed by means of the MIMO are allocated to a single baseband signal preprocessor 102. In the fourth embodiment, like configurations and processing as of the first to third embodiments are denoted by like numerals, and the descriptions thereof are omitted.

Figure 7A:
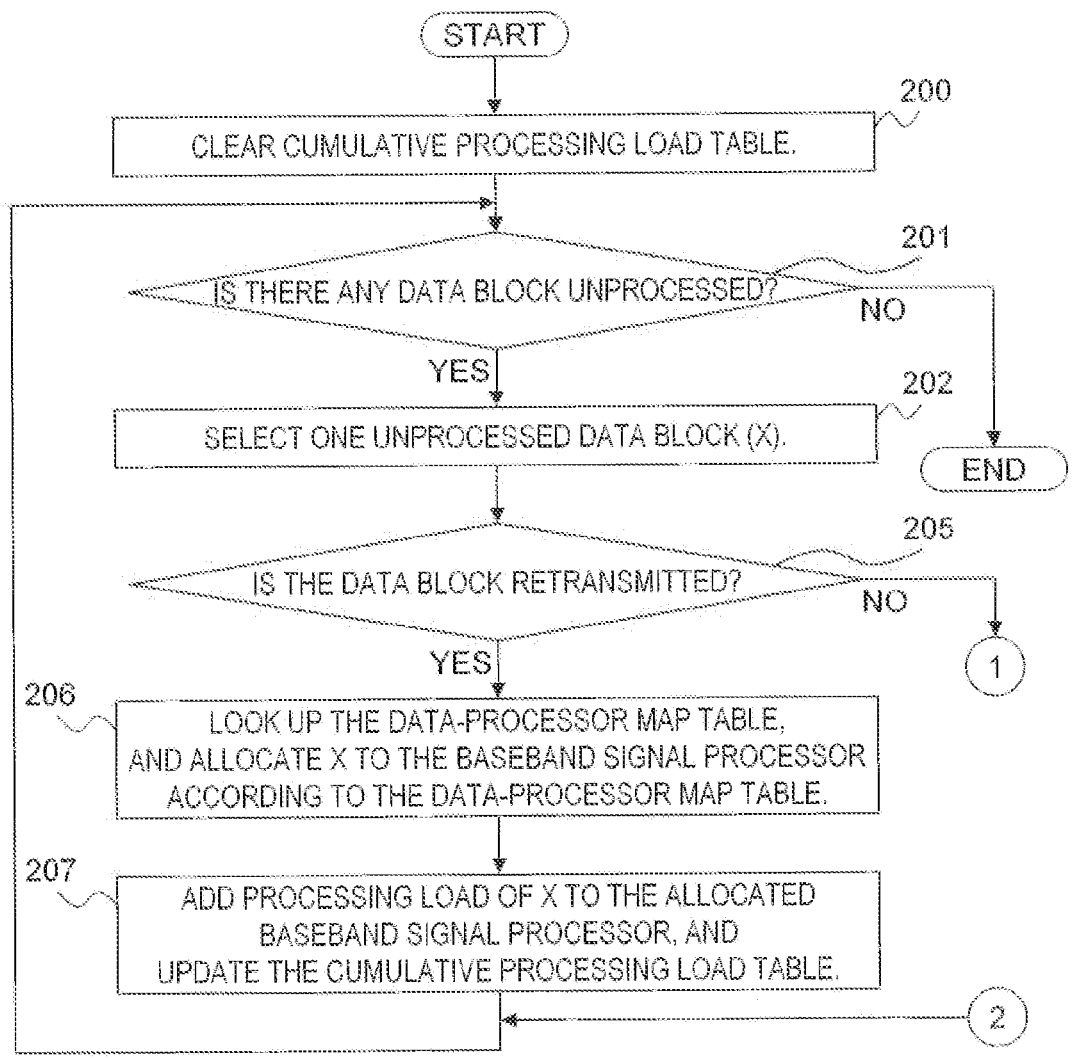
FIGS. 7A and 7B are flowcharts illustrating processing performed by the baseband allocator according to a fourth embodiment.
Figure 7B:
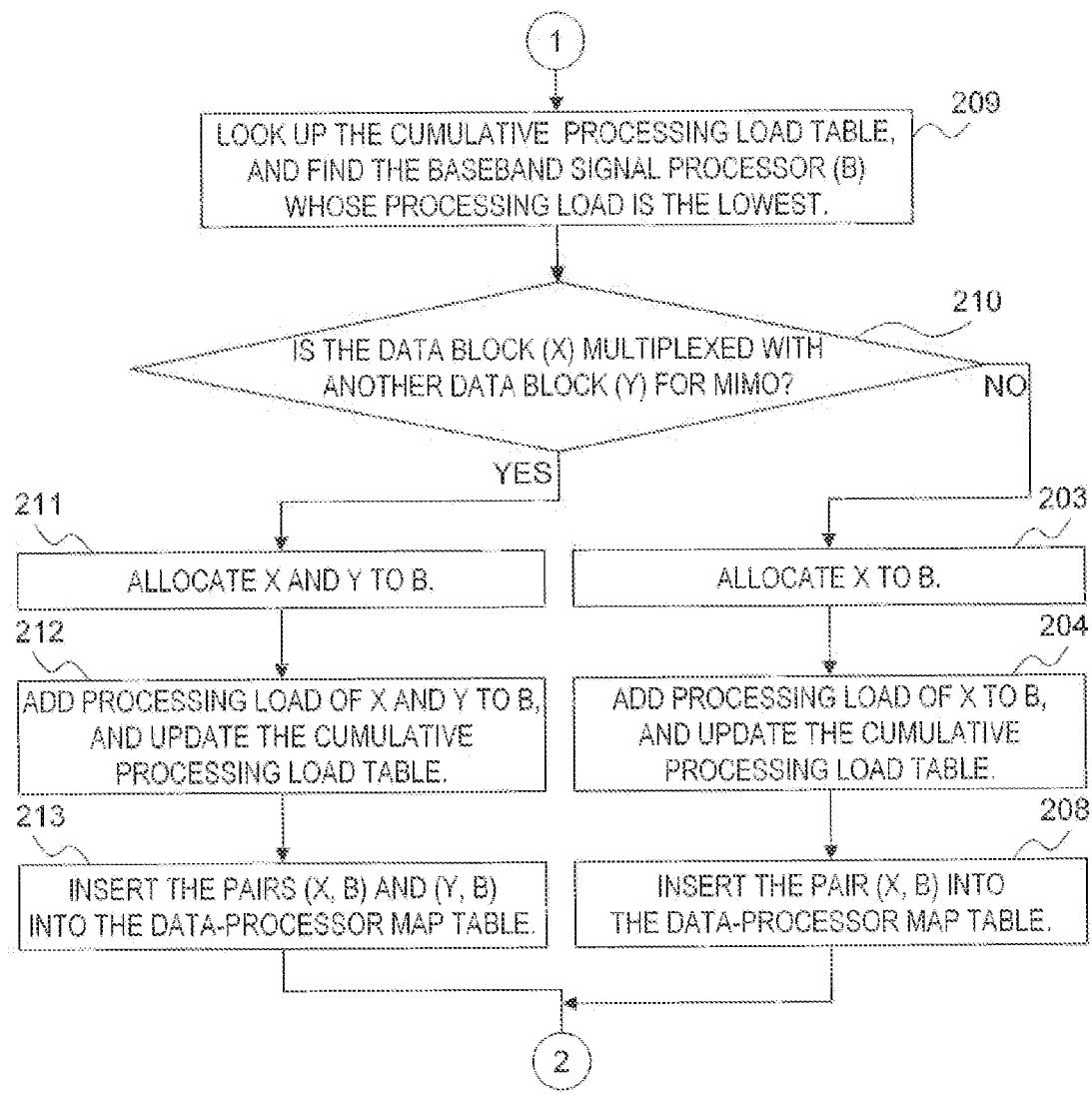

FIGS. 7A and 7B are flowcharts illustrating processing performed by the baseband allocator 101 according to die fourth embodiment. The processing is performed for each basic unit (such as the frame) of the data allocation after the MCS and the resource allocation information are transmitted from the scheduler 100 to the baseband allocator 101.

First, the baseband allocator 101 clears the cumulative processing load table 1011 (Step 200).

Then, processing in Steps 201 to 204 is repeated for all the data blocks. In Step 201, the baseband allocator 101 determines whether there is an unprocessed data block or not, and finishes the processing when all the data blocks have been processed.

On the other hand, when there is an unprocessed data block, the baseband allocator 101 selects one unprocessed data block (Step 202). In the following description, an ID of the selected data block is x. On this occasion, the data block is a set of data which cannot be divided any more in the baseband signal processing, and is usually a set of data to which error correction processing is applied. The data block is referred to as "transport block" in the 3GPP standard. The ID of the data block may be an ID newly set for this processing, or may be an ID given in a standard operation. The RNTI can be used as the ID in the 3GPP standard.

Then, the baseband allocator 101 determines whether the data block X is subject to the HARQ retransmission or not (Step 205). When the data block X is subject to the HARQ retransmission, the processing proceeds to Step 206, and when the data block is subject to the first transmission, the processing proceeds to Step 209.

When the data block X is subject to the HARQ retransmission, the baseband allocator 101 looks up the data-processor map table 1012. thereby acquiring the ID of a baseband signal preprocessor 102 allocated when the data block X was transmitted for the first time (Step 206).

Then, the baseband allocator 101 reflects a processing load for the data block allocated in Step 206 to the cumulative processing load table lull (Step 207). Then, the processing returns to Step 201, and the baseband allocator 101 repeats the processing until all the data blocks are processed.

On the other hand, when the data block is subject to the first transmission, the baseband allocator 101 looks up the cumulative processing load table 1011, and searches for the baseband signal preprocessor (B) whose cumulative processing load is the lowest (Step 203).

Then, the baseband allocator 101 determines whether die data block X is multiplexed with another data block Y by means of the MIMO or not (Step 210). When the data block X is multiplexed by means of the MIMO, the processing proceeds to Step 211, and when the data block X is not multiplexed by means of the MIMO, the processing proceeds to Step 203.

When the data block X is not multiplexed by means of the MIMO, the baseband allocator 101 looks up the cumulative processing load table lull, and searches for the baseband signal preprocessor 102 (B) whose the cumulative processing load is the lowest (Step 203). Then, the baseband allocator 101 allocates the processing for the data block X to the retrieved baseband signal preprocessor 102 (B) having the lowest cumulative processing load.

Then, the baseband allocator 101 reflects a processing load for die data block allocated in Step 203 to the cumulative processing load table 1011 (Step 204).

Then, the baseband allocator 101 inserts the pair of the data block X and the baseband signal preprocessor 102 (B) allocated in Step 203 into the data-processor map table 1012 (Step 208). Then, the processing returns to Step 201, and the baseband allocator 101 repeats the processing until all the data blocks are processed.

On the other hand, when the data block X is multiplexed by means of the MIMO, the baseband allocator 101 allocates processing for both the data blocks x and y to the retrieved baseband signal preprocessor 102 (B) having the lowest cumulative processing load (Step 211).

Then, the baseband allocator 101 reflects the processing load of the data blocks x and y allocated in Step 211 to the cumulative processing load on the baseband signal preprocessor 102 (B) stored in the cumulative processing load table 1011 (Step 212).

Then, the baseband allocator 101 inserts the pair of the data block X and the baseband, signal preprocessor 102 (B) and the pair of the data block Y and the baseband signal preprocessor 102 (B) allocated in Step 211 into the data-processor map table 1012 (Step 213). Then, the processing returns to Step 201, and the baseband allocator 101. repeats the processing until all the data blocks are processed.

As described above, in the fourth embodiment, data blocks subject to the MIMO multiplexing can be allocated to the same baseband signal preprocessor 102, thereby increasing the processing efficiency in the MIMO multiplexing.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which, means that a processor interprets and executes programs providing the functions. The information of programs, tables, and files to implement the functions may be stored In a storage device such as a memory, a hard disk drive, or an SSD (a Solid State Drive), or a storage medium such as an IC card, or an SD card. The drawings shows control lines and information lines as considered necessary for explanation but do not show all control lines or information lines in the products. It can be considered that almost of all components are actually interconnected.

What is claimed is:

1. A wireless communication method for communicating with a user terminal by a wireless communication base station, the method comprising:
   performing baseband signal processing by a plurality of baseband signal processing units;
   selecting, by a baseband allocation unit, for each received data block, the baseband signal processing unit out of the plurality of baseband signal processing units to perform baseband processing on the data block to generate a transmission signal;
   mapping, by the baseband allocation unit, hold map information for managing the allocation of the baseband signal processing;
   selecting, by the baseband allocation unit, for retransmission of the received data block the baseband signal processing unit identified by looking up the map information on a condition that the data block is to be retransmitted;
   processing, by a linear processing unit, the transmission signals received from the plurality of baseband signal processing units through linear transformation, and send the linear transformed signals to an antenna system for transmission to the user terminal;
   determining whether a plurality of received data blocks are to be multiplexed for multiple-input multiple-output (MIMO) transmission, and allocating the baseband signal processing for the plurality of received data, the selected baseband signal processing unit to be multiplexed for MIMO transmission to the user terminal.

2. The wireless communication method according to claim 1 further comprising:
   allocating, by the baseband allocating unit, baseband signal processing based on a processing load on each of the plurality of baseband signal processing units.

3. The wireless communication method according to claim 1 further comprising:
   determining, by the baseband allocation unit, a number of baseband signal processing units to operate based on a processing load on each of the plurality of baseband signal processing units; and
   allocating the baseband signal processing to the determined number of baseband signal processing units.

4. A wireless communication base station for communicating with a user terminal, comprising:
   a plurality of baseband signal processing units stored in one or more central processing units (CPUs) for performing baseband signal processing;
   a baseband allocation unit is configured to select, for each received data block, a baseband signal processing unit out of the plurality of baseband signal processing units to perform baseband processing on the data block to generate a transmission signal;
   the baseband allocation unit is further configured to hold map information for managing the allocation of the baseband signal processing;
   the baseband allocation unit is further configured to select for retransmission of the received data block the baseband signal processing unit identified by looking up the map information on a condition that the data block is to be retransmitted; and
   a linear processing unit configured to process the transmission signals received from the plurality of baseband signal processing units through linear transformation, and send the linear transformed signals to an antenna system for transmission to the user terminal;
   wherein the baseband allocation unit is configured to:
   determine whether a plurality of received data blocks are to be multiplexed for multiple-input multiple-output (MIMO) transmission; and
   allocate the baseband signal processing for the plurality of received data blocks to the selected baseband signal processing unit to be multiplexed for MIMO transmission to the user terminal.

5. The wireless communication base station according to claim 4, wherein the baseband allocation unit allocates the baseband signal processing based on a processing load on each of the plurality of baseband signal processing units.

6. The wireless communication base station according to claim 4, wherein the baseband allocation unit is configured to:
   determine a number of baseband signal processing units to operate based on a processing load on each of the plurality of baseband signal processing units; and
   allocate the baseband signal processing to the determined number of baseband signal processing units.

* * * * *